(12) United States Patent
Onishi

(10) Patent No.: US 11,044,443 B2
(45) Date of Patent: Jun. 22, 2021

(54) OPERATION INFORMATION TRANSMISSION DEVICE, CONSTRUCTION MANAGEMENT SYSTEM, OPERATION INFORMATION TRANSMISSION METHOD, AND PROGRAM

(71) Applicant: Komatsu Ltd., Tokyo (JP)

(72) Inventor: Yoshiyuki Onishi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 16/497,829

(22) PCT Filed: Jun. 27, 2018

(86) PCT No.: PCT/JP2018/024372
§ 371 (c)(1),
(2) Date: Sep. 26, 2019

(87) PCT Pub. No.: WO2019/012993
PCT Pub. Date: Jan. 17, 2019

(65) Prior Publication Data
US 2020/0053321 A1     Feb. 13, 2020

(30) Foreign Application Priority Data
Jul. 14, 2017   (JP) .............................. JP2017-138509

(51) Int. Cl.
*H04N 7/18*     (2006.01)
*G06Q 50/08*     (2012.01)

(52) U.S. Cl.
CPC ............... *H04N 7/18* (2013.01); *G06Q 50/08* (2013.01)

(58) Field of Classification Search
CPC .......... H04N 7/18; H04N 7/181; G06Q 50/08; E02F 9/26
See application file for complete search history.

(56) References Cited

U.S. PATENT DOCUMENTS

| | | |
|---|---|---|
| 2011/0299730 A1 | 12/2011 | Elinas et al. |
| 2017/0255895 A1 | 9/2017 | Kozumi et al. |
| 2018/0216318 A1 | 8/2018 | Shike |
| 2018/0355585 A1* | 12/2018 | Ohiwa ...................... E02F 9/26 |
| 2018/0355586 A1* | 12/2018 | Ohiwa ...................... E02F 9/26 |
| 2018/0357583 A1* | 12/2018 | Guillemette ........ G06F 13/4282 |

FOREIGN PATENT DOCUMENTS

| | | |
|---|---|---|
| AU | 2016336318 B2 | 4/2017 |
| JP | 2003-132116 A | 5/2003 |
| JP | 2003-329448 A | 11/2003 |
| JP | 2005-250990 A | 9/2005 |
| JP | 2013-036243 A | 2/2013 |
| JP | 2017-033047 A | 2/2017 |
| KR | 10-2016-0110642 A | 9/2016 |
| WO | 2016/125915 A1 | 8/2016 |

\* cited by examiner

*Primary Examiner* — Jared Walker
(74) *Attorney, Agent, or Firm* — Locke Lord LLP

(57) ABSTRACT

An operation information transmission device transmits a state of each work medium performing work in a construction site (F) to an information providing device. The operation information transmission device includes an image data acquisition unit that acquires image data including the work medium, a type/state specifying unit that specifies the type and a state of the work medium included in the image data, and an operation information transmission unit that transmits operation information indicating the specified type and state of the work medium to the information providing device.

18 Claims, 6 Drawing Sheets

<OPERATION INFORMATION>

| CONSTRUCTION SITE F-1 | | |
|---|---|---|
| TYPE OF WORK MEDIUM (CONSTRUCTION MACHINE /VEHICLE/WORKER) | STATUS | POSITION |
| HE01 | STOPPAGE | (XX,YY,ZZ) |
| HE02 | OPERATING | (XX,YY,ZZ) |
| DT01 | TRAVELING | (XX,YY,ZZ) |
| DT02 | LOADING | (XX,YY,ZZ) |
| WORKER 01 | WALKING | (XX,YY,ZZ) |
| WORKER 02 | WALKING | (XX,YY,ZZ) |
| ⋮ | ⋮ | ⋮ |

OPERATION INFORMATION TRANSMISSION DEVICE, CONSTRUCTION MANAGEMENT SYSTEM, OPERATION INFORMATION TRANSMISSION METHOD, AND PROGRAM

TECHNICAL FIELD

The present invention relates to an operation information transmission device, a construction management system, an operation information transmission method, and a program.

Priority is claimed on Japanese Patent Application No. 2017-138509, filed on Jul. 14, 2017, the content of which is incorporated herein by reference.

BACKGROUND ART

As disclosed in PTL 1, there is a technique in which image data of a construction site is acquired by using a stereo camera provided in a work machine, and three-dimensional data is created by using the image data. Progress management for a construction site is possible by creating three-dimensional data of a landform of the construction site.

CITATION LIST

Patent Literature

[PTL 1] Japanese Unexamined Patent Application, First Publication No. 2013-036243

SUMMARY OF INVENTION

Technical Problem

There is a desire to recognize not only three-dimensional data of a landform of a construction site but also an action or a state (for example, whether or not a work medium is being operated) of each work medium performing work in the construction site in detail.

The present invention is directed to providing an operation information transmission device, a construction management system, an operation information transmission method, and a program capable of recognizing a state of a work medium performing work in a construction site in detail.

Solution to Problem

According to first aspect of the present invention, there is provided an operation information transmission device transmitting a state of each work medium performing work in a construction site to a server device, the operation information transmission device including an image data acquisition unit that acquires image data including the work medium; a type/state specifying unit that specifies the type and a state of the work medium included in the image data; and an operation information transmission unit that transmits operation information indicating the specified type and state of the work medium to the server device.

Advantageous Effects of Invention

According to at least one of the aspects, it is possible to recognize a state of a work medium performing work in a construction site in detail.

DESCRIPTION OF EMBODIMENTS

First Embodiment (Overall Configuration of Construction Management System)

Figure 1:
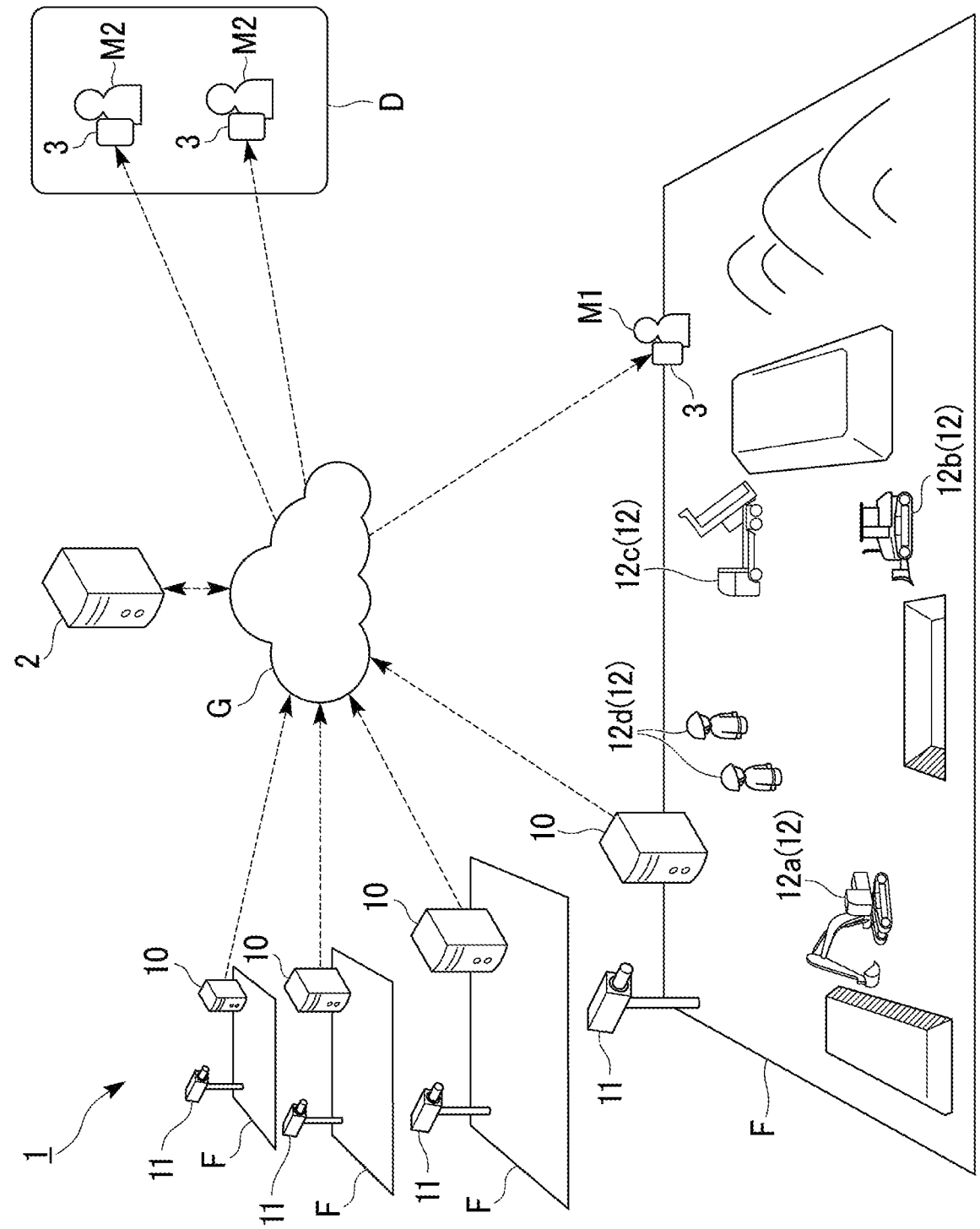
FIG. 1 is a schematic diagram illustrating the overall configuration of a construction management system according to a first embodiment.

FIG. 1 is a schematic diagram illustrating the overall configuration of a construction management system according to a first embodiment.

As shown in FIG. 1, a construction management system 1 includes operation information transmission devices 10, stereo cameras 11, an information providing device 2, and output devices 3.

The operation information transmission devices 10 are computers respectively provided in site offices installed in construction sites F. The operation information transmission devices 10 are respectively provided in a plurality of construction sites F and transmits the types and states of plural work media 12 performing construction work in the construction sites F to the information providing device 2 which is a server device via a wide area network G. The wide area network G is a so-called Internet communication network or a mobile communication network such as LTE/3G. The "work media" collectively indicate all people and objects work machines, for example, a hydraulic excavator or a wheel loader, dump trucks, and workers which are present in the construction sites F and are related to construction work in the construction sites F.

The operation information transmission device 10 is communicably connected to an imaging device, for example, the stereo camera 11 provided in the construction site F in a wired (or wireless) manner and acquires moving image data generated through capturing images in the stereo camera 11. The operation information transmission device 10 may be provided at a location far from the construction site F.

The stereo camera 11 is a stereo camera provided to be able to capture images the entire construction site F. The stereo camera 11 according to the present embodiment is capable of capturing moving images. Here, the moving image data generated through capturing images in the stereo camera 11 is an aspect of "a plurality of pieces of image data generated through consecutive capturing images". The "image data" in the present embodiment indicates data forming a single "still image".

The stereo camera 11 according to the present embodiment is preferably a high-resolution camera in order to increase the accuracy of an image extraction process which will be described later.

The present embodiment is an aspect in which the single stereo camera 11 is provided each construction site F, but other embodiments are not limited to this aspect. The construction management system 1 according to other embodiments may be in an aspect in which a plurality of stereo cameras 11 are provided in the construction site F.

The information providing device 2 is a server device which collects operation information from the operation information transmission device 10 provided in each construction site F via the wide area network G and is a device which processes the operation information received from each operation information transmission device 10 to be viewable and provides the operation information to a user via the Internet or the like.

The output device 3 receives the operation information provided from the information providing device 2 via the wide area network G and informs the user of the operation information. For example, a worker M1 performing construction work in a certain construction site F can acquire the operation information on the spot through the output device 3 carried by the worker, for example, a tablet terminal. A manager M2 (a general manager or the like) present at a remote location D far from the construction site F can acquire the operation information through the output device 3 carried by the manager. Progress information may also be acquired to be output with a printer or the like.

A hydraulic excavator 12*a*, a wheel loader 12*b*, a dump truck 12*c*, and workers 12*d* are aspects of the work media 12 performing construction work in the construction site F. The work media 12 may include various work machines such as a bulldozer or a road roller, and a drone which captures images of the construction site F from the sky.

(Functional Configurations of Operation Information Transmission Device and the Like)

Figure 2:
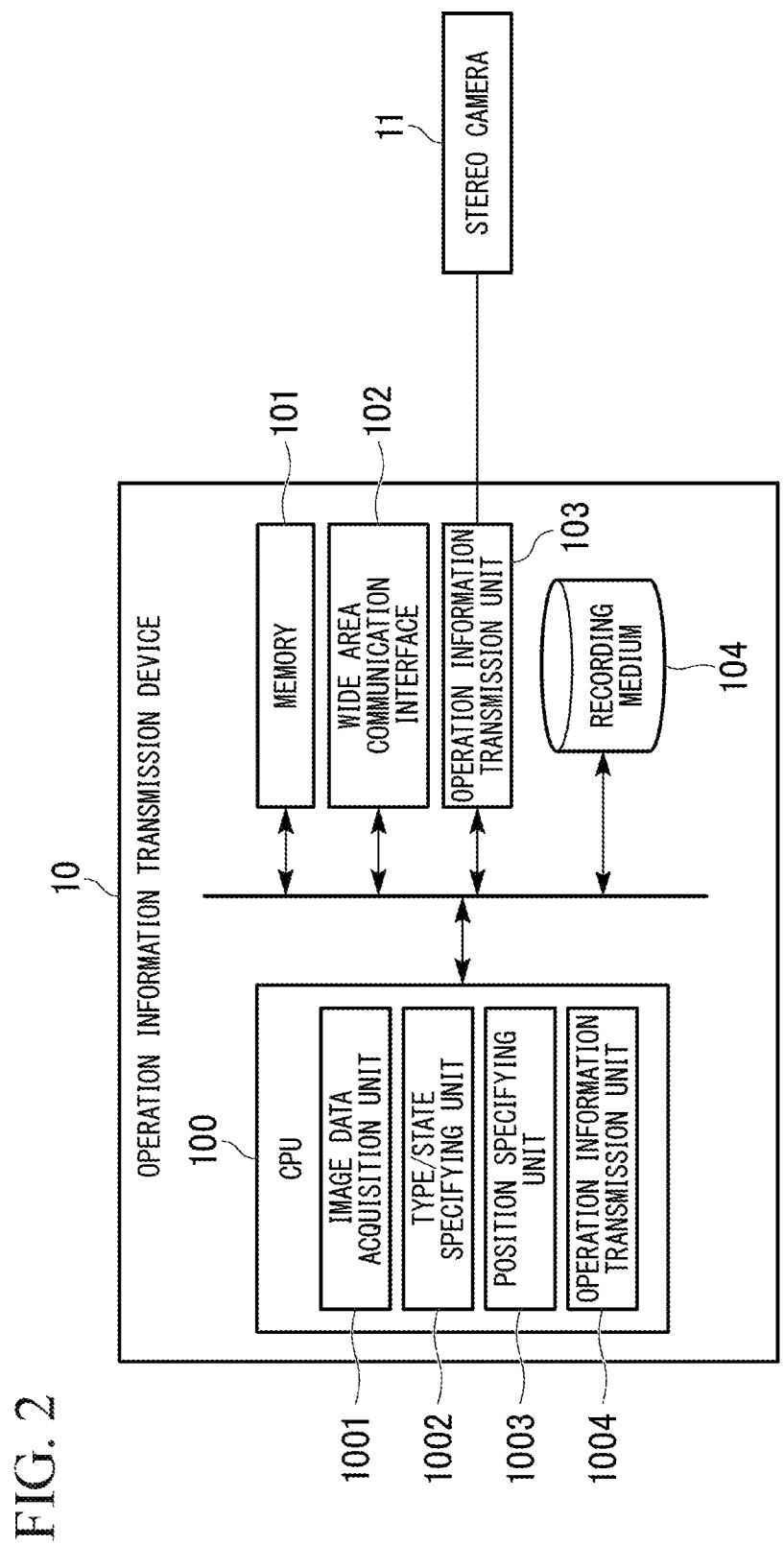
FIG. 2 is a diagram illustrating functional configurations of an operation information transmission device and the like according to the first embodiment.

FIG. 2 is a diagram illustrating functional configurations of the operation information transmission device and the like according to the first embodiment.

As shown in FIG. 2, the operation information transmission device 10 includes a CPU 100, a memory 101, a wide area communication interface 102, a connection interface 103, and a recording medium 104.

The CPU 100 is a processor which controls overall operations of the operation information transmission device 10. The CPU 100 reads a program or data stored on the recording medium 104 or the like to the memory 101 and executes processes defined in the program so as to realize each function which will be described later.

The memory 101 is a volatile memory (RAM) used as a work area of the CPU 100.

The wide area communication interface 102 is a connection interface used for the operation information transmission device 10 to transmit and receive information to and from the information providing device 2 via the wide area network G. The wide area communication interface 102 may be connected to the operation information transmission device 10 via the wide area network G in a wired or wireless manner.

The connection interface 103 is a connection interface used to be communicably connected to the stereo camera 11 provided in the construction site F in a wired or wireless manner.

The recording medium 104 is realized by a large capacity recording device such as a hard disk drive (HDD) or a solid state drive (SSD) and stores an operation system (OS), an application program, and various pieces of data. In the present embodiment, image data (moving image data) generated through capturing images in the stereo camera 11 is recorded and preserved on the recording medium 104.

The CPU 100 operates on the basis of the program, and thus realizes functions of an image data acquisition unit 1001, a type/state specifying unit 1002, a position specifying unit 1003, and an operation information transmission unit 1004, shown in FIG. 2.

The image data acquisition unit 1001 acquires moving image data generated through capturing images in the stereo camera 11 via the connection interface 103. The moving image data includes an image of the work medium 12 performing work in the construction site F.

The type/state specifying unit 1002 performs an image extraction process on the moving image data acquired by the image data acquisition unit 1001, so as to specify the types of work media 12 (the hydraulic excavator 12*a*, the wheel loader 12*b*, the dump truck 12*c*, the worker 12*d*, . . . ) and a state (operating, traveling, stoppage, walking, . . . ) of each work medium 12, included in the moving image data. Here, the image extraction process is, for example, a process in which pattern matching with a "feature pattern" defined for each type of work medium 12 is performed on any image data, and thus an image of the work medium 12 is extracted from the image data.

The position specifying unit 1003 specifies a position where the captured work medium 12 is present on the basis of the moving image data acquired by the image data acquisition unit 1001. Specifically, the position specifying unit 1003 performs a stereo matching process on stereo images generated through capturing images in the stereo camera 11, so as to specify a three-dimensional position (X, Y, Z) of the work medium 12 included in the stereo images.

The operation information transmission unit 1004 transmits operation information indicating the type of work medium 12 and the state thereof and the position of each work medium 12, specified by the type/state specifying unit 1002 and the position specifying unit 1003, to the information providing device 2 via the wide area network G.

(Functional Configuration of Information Providing Device)

Figure 3:
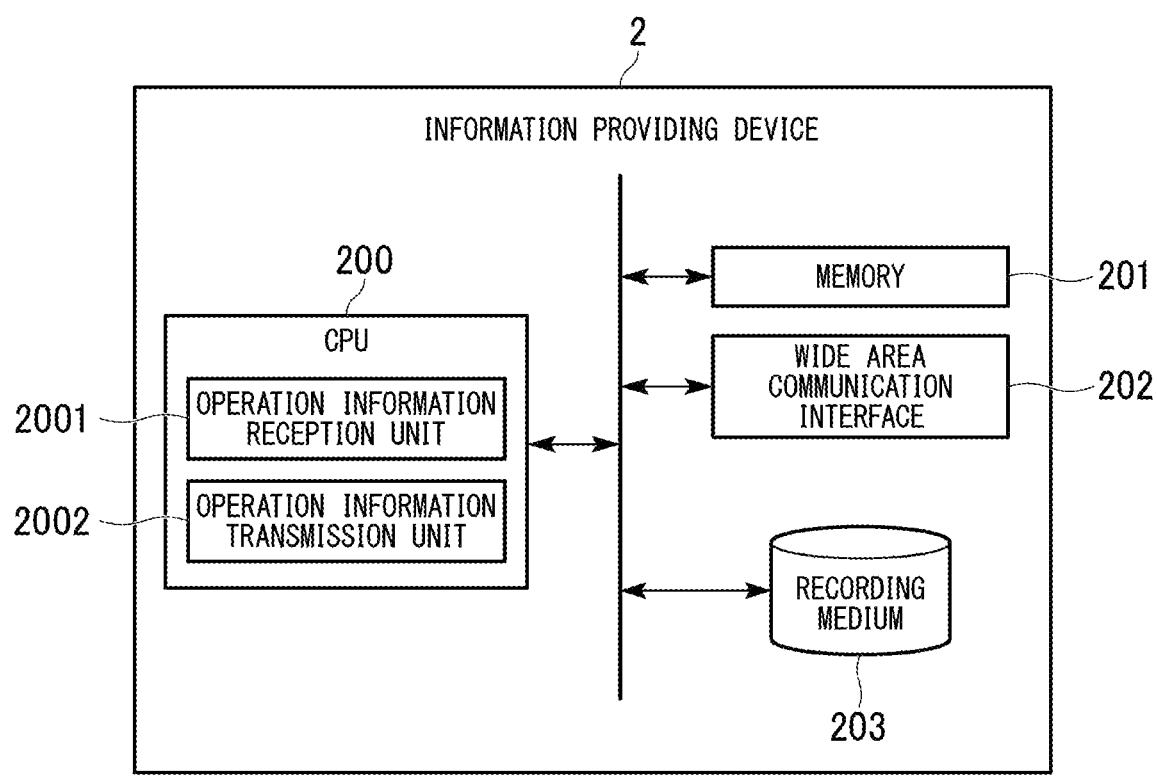
FIG. 3 is a diagram illustrating a functional configuration of an information providing device according to the first embodiment.

FIG. 3 is a diagram illustrating a functional configuration of the information providing device according to the first embodiment.

As shown in FIG. 3, the information providing device 2 includes a CPU 200, a memory 201, a wide area communication interface 202, and a recording medium 203.

The CPU 200 is a processor which controls overall operations of the information providing device 2. The CPU 200 reads a program or data stored on the recording medium 203 or the like to the memory 201 and executes processes defined in the program so as to realize each function which will be described later.

The memory 201 is a volatile memory (RAM) used as a work area of the CPU 200.

The wide area communication interface 202 is a connection interface used for the information providing device 2 to receive operation information from a plurality of operation information transmission devices 10 via the wide area network G. The wide area communication interface 202 may be connected to the information providing device 2 via the wide area network G in a wired or wireless manner.

The recording medium 203 is realized by a large capacity recording device such as an HDD or an SSD and stores an OS, an application program, and various pieces of data. In the present embodiment, the history of operation information of each construction site F or the like, received from the operation information transmission device 10, is recorded and preserved in the recording medium 203.

The CPU 200 operates on the basis of the program, and thus realizes functions of an operation information reception unit 2001 and an operation information transmission unit 2002 shown in FIG. 3.

The operation information reception unit 2001 receives operation information indicating the type and a state of work medium 12 in the construction site F in which the operation information transmission device 10 is provided, from each of the plurality of operation information transmission device 10 via the wide area network G.

The operation information transmission unit 2002 transmits the operation information received by the operation information reception unit 2001 to the output device 3 in response to a request from the output device 3 carried by a user (the worker M1, the manager M2, or the like).

(Process Flow in Operation Information Transmission Device)

Figure 4:
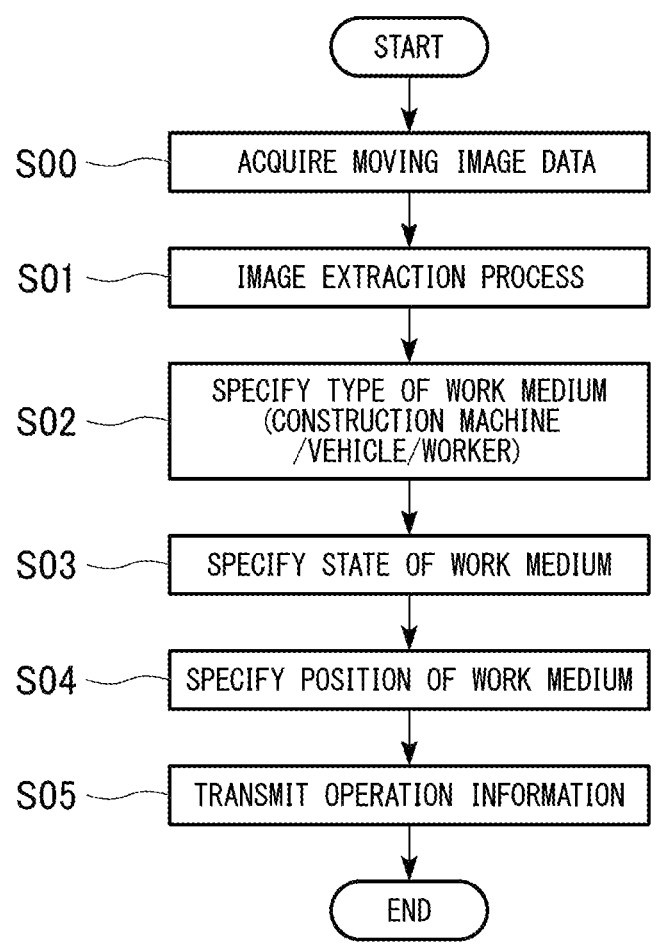
FIG. 4 is a flowchart illustrating a process flow in the operation information transmission device according to the first embodiment.

FIG. 4 is a flowchart illustrating a process flow in the operation information transmission device according to the first embodiment.

Figure 5:
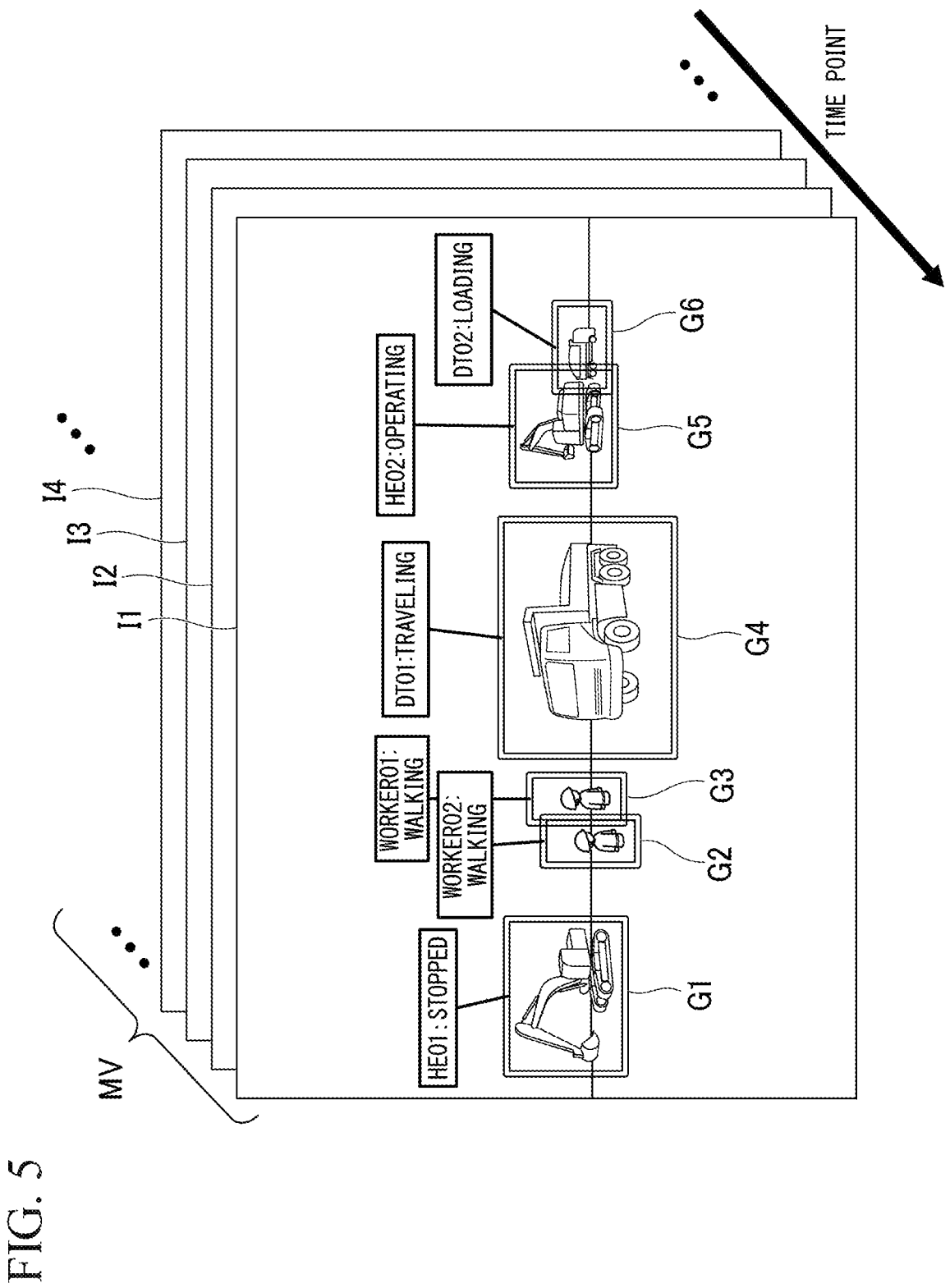
FIG. 5 is a first diagram for describing a function of the operation information transmission device according to the first embodiment.
Figures 6, 7:
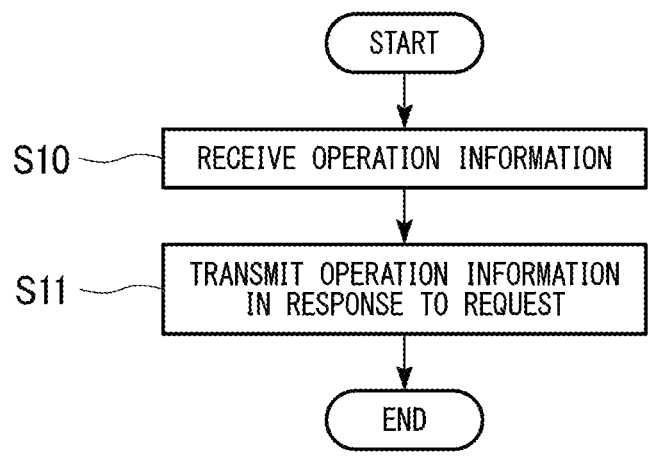
FIG. 6 is a second diagram for describing a function of the operation information transmission device according to the first embodiment.
FIG. 7 is a flowchart illustrating a process flow in the information providing device according to the first embodiment.

FIGS. 5 and 6 are respectively a first diagram and a second diagram for describing a function of the operation information transmission device according to the first embodiment.

Hereinafter, with reference to FIGS. 4 to 6, a description will be made of a flow of a process in the operation information transmission device 10.

The process flow in the operation information transmission device 10 shown in FIG. 4 is continuously repeatedly executed while the stereo camera 11 is capturing moving images.

The image data acquisition unit 1001 (CPU 100) of the operation information transmission device 10 receives moving image data generated through capturing images from the stereo camera 11 (step S00).

Next, the type/state specifying unit 1002 (CPU 100) performs an image extraction process, a type specifying process, and a state specifying process (steps S01 to S03) on the moving image data received in step S00.

Here, the respective processes (steps S01 to S03) performed by the type/state specifying unit 1002 will be described in detail with reference to FIG. 5.

As shown in FIG. 5, moving image data MV includes a plurality of pieces of image data I1, I2, I3, I4, . . . which are consecutively captured in a predetermined cycle (for example, 1/60 seconds).

In a case where the new image data I1 is acquired at a certain time point, the type/state specifying unit 1002 performs an image extraction process on the image data I1 (step S01 in FIG. 4). Here, the type/state specifying unit 1002 performs collation on the image data I1 with a feature pattern prepared for each type of work medium 12, and thus extracts a region in which an image of each work medium 12 is captured. For example, the type/state specifying unit 1002 extracts a region G1 matching a feature pattern of the hydraulic excavator 12a from the image data I1 through a pattern matching process. The type/state specifying unit 1002 extracts regions G2 and G3 matching feature patterns of the workers 12d from the image data I1. This is also the same for other regions (regions G4 to G6).

Next, the type/state specifying unit 1002 specifies the type of work medium 12 included in each of the regions G1 to G6 (step S02 in FIG. 4). For example, the type/state specifying unit 1002 attaches an indicator "HE01" indicating that the type is a "hydraulic excavator" to the single region G1 which is extracted on the basis of the feature pattern of the hydraulic excavator. Similarly, the type/state specifying unit 1002 attaches indicators "worker01" and "worker02" indicating that the type is a "worker" to the two regions G2 and G3 which are extracted on the basis of the feature patterns of the workers. Similarly, the type/state specifying unit 1002 attaches indicators "DT01" and "DT02" indicating that the type is a "dump truck" to the two regions G4 and G6 which are extracted on the basis of the feature patterns of the dump trucks.

Next, the type/state specifying unit 1002 specifies a state of the work medium 12 included in each of the regions G1 to G6 on the basis of difference among the plurality of image data I1, I2, . . . which are consecutively acquired (step S03 in FIG. 4).

For example, the type/state specifying unit 1002 extracts the region G1 which is extracted on the basis of the feature pattern of the hydraulic excavator from the plurality of image data I1, I2, . . . which are consecutively acquired. Here, the type/state specifying unit 1002 compares an image of the region G1 (an image of the hydraulic excavator) in the image data I1 with an image of the region G1 in the image data I2 which is previously acquired in time series and determines whether or not the images are different from each other. In the example shown in FIG. 5, since the images included in the region G1 in the respective pieces of image data I1, I2, . . . do not change, the type/state specifying unit 1002 determines that the hydraulic excavator "HE01" is "stopped".

The type/state specifying unit 1002 extracts the region G4 which is extracted on the basis of the feature pattern of the dump truck in the respective pieces of image data I1, I2, . . . which are consecutively acquired. In this case, the type/state specifying unit 1002 compares a position of an image of the region G4 (an image of the dump truck) in the image data I1 with a position of an image of the region G4 in the image data I2 and determines whether or not a difference between the positions of the images of the dump truck in the respective pieces of image data is equal to or more than a predetermined distance. In the example shown in FIG. 5, since the positions of the images of the dump truck included in the region G4 change in the respective pieces of image data I1, I2, . . . , the type/state specifying unit 1002 determines that the dump truck "DT01" is "traveling".

Referring to FIG. 4 again, the position specifying unit 1003 (CPU 100) specifies a position of each work medium 12 specified in steps S01 to S03 on the basis of the moving image data (step S04). Here, the moving image data (the image data I1, I2, . . . (FIG. 5)) acquired through capturing images in the stereo camera 11 is stereo images which are simultaneously captured and generated by two cameras. The position specifying unit 1003 performs each of the stereo images so as to specify a three-dimensional position (X, Y, Z) of each extracted work medium 12.

The operation information transmission unit 1004 collects pieces of information specified in various specifying processes in steps S02 to S04 so as to create operation information and transmits the operation information to the information providing device 2 (step S05).

Here, FIG. 6 illustrates an example of operation information which is created and transmitted by the operation information transmission unit 1004. As shown in FIG. 6, in the operation information, identification information (F-1) for specifying the construction site F is associated with the "types", "states", and "positions" of the work media 12 performing work in the construction site F.

(Process Flow in Information Providing Device)

FIG. 7 is a flowchart illustrating a process flow in the information providing device according to the first embodiment.

The process flow shown in FIG. 7 is periodically repeatedly executed by the CPU 200 of the information providing device 2.

The operation information reception unit 2001 (CPU 200) of the information providing device 2 receives operation information (refer to FIG. 6) from each of a plurality of operation information transmission devices 10 via the wide area network G (step S10). Here, the received operation information is immediately processed into a viewable state with a web browser or the like.

The operation information transmission unit 2002 (CPU 200) transmits the operation information created in step S10 to each output device 3 in response to a viewing request from the output device 3 carried by a user (the worker M1 or the manager M2) (step S11). Consequently, the user can check operation information of each work medium 12 in the desired construction site F on a display panel of each output device 3 at any time.

Advantageous Effects

As described above, according to the construction management system 1 according to the first embodiment, the operation information transmission device 10 receives moving image data (a plurality of pieces of image data) in which the work medium 12 performing work in the construction site F is captured, from the stereo camera 11 provided in the construction site F.

The operation information transmission device 10 performs an image extraction process on the moving image data and specifies the type and the state of a work medium included in the moving image data.

The operation information transmission device 10 transmits operation information indicating the specified type and state of the work medium 12 to the information providing device 2 via the wide area network G.

Here, among work machines performing construction, a work machine (ICT construction machine) provided with a sensor group which can detect a state (operating, stoppage, traveling, loading, or the like) or a position, an azimuth, and a pose thereof and having a function (ICT function) of sequentially transmitting the information to a server device via a network (wide area network G). However, all work machines used in a construction site do not have the ICT function. In other words, there may be a construction machine (standard construction machine) not having the ICT function depending on construction sites.

According to the configuration of the present embodiment, states of all the work media 12 captured by the stereo camera 11 can be recognized regardless of an ICT construction machine and a standard construction machine, and thus the operation states of all work media in each construction site can be recognized in detail with the simple configuration.

According to the construction management system 1 of the first embodiment, the operation information transmission device 10 specifies a position of the work medium 12 on the basis of the moving image data.

In the above-described way, positions of all work media 12 captured by the stereo camera 11 can be recognized regardless of an ICT construction machine and a standard construction machine.

Modification Examples

As mentioned above, the construction management system 1 according to the first embodiment has been described in detail, but specific aspects of the construction management system 1 are not limited to the above aspects, and various design changes may occur within the scope without departing from the spirit.

A description has been made of an aspect in which the operation information transmission device 10 according to the first embodiment acquires moving image data from a "provided camera" (stereo camera 11), but there is no limitation to the aspect in other embodiments. In other embodiments, a camera capturing images of the construction site F is not necessarily provided therein, and may be mounted on, for example, a drone or a work machine.

A description has been made of an aspect in which the operation information transmission device 10 according to the first embodiment acquires "moving image data" from the stereo camera 11, but there is no limitation to the aspect in other embodiments. There may be an aspect in which the operation information transmission device 10 according to other embodiments acquires image data (still images), for example, at a predetermined time interval (for example, an interval of several seconds).

In this case, the type/state specifying unit 1002 specifies the type and a state of each work medium 12 on the basis of an image extraction process on each piece of image data acquired as mentioned above.

The operation information transmission device 10 according to other embodiments may have a function of identifying each of the work media 12 included in acquired image data. For example, in FIG. 5, the operation information transmission device 10 may identify an individual of a dump truck (a dump truck A, a dump truck B, or the like) on the basis of a specific feature which can be read from exteriors of the dump trucks respectively included in the regions G4 and G6.

In this case, the operation information transmission device 10 may identify an individual by reading an identification medium (a specific mark, a barcode, a two-dimensional code, or the like) uniquely attached to each work medium 12 (dump truck) from the image data, and may identify an individual by an unique feature in appearance (for example, vehicle design) that is present in each dump truck.

In the first embodiment, the wide area network G has been described to be an Internet communication line, but is not limited to this aspect in other embodiments. The wide area network G may be, for example, a dedicated communication line built over a plurality of construction sites F.

In the above-described respective embodiments, procedures of various processes in the operation information transmission device 10 and the information providing device 2 may be stored on a computer readable recording medium in a program format, and a computer reads and executes the program so as to perform the various processes. Examples of the computer readable recording medium include a magnetic disk, a magneto-optical disc, a CD-ROM, a DVD-ROM, and a semiconductor memory. The computer program may be delivered to the computer via a communication line, and the computer may execute the delivered program.

The program may realize some of the functions. The program may be a so-called difference file (difference program) which can realize the functions through a combination with a program which is already recorded in a computer system.

As mentioned above, several embodiments of the present invention have been described, but the embodiments are presented as only examples, and thus are not intended to limit the scope of the invention. The embodiments may be implemented in other various forms, and various omissions, alterations, and changes may occur within the scope without departing from the spirit of the invention. The embodiments or modifications thereof are included in the inventions disclosed in the claims and equivalents thereof as included in the scope and the spirit of the invention.

INDUSTRIAL APPLICABILITY

The operation information transmission device enables a state of a work medium performing work in a construction site to be recognized in detail.

REFERENCE SIGNS LIST

1: CONSTRUCTION MANAGEMENT SYSTEM
10: OPERATION INFORMATION TRANSMISSION DEVICE
100: CPU
1001: IMAGE DATA ACQUISITION UNIT
1002: TYPE/STATE SPECIFYING UNIT
1003: POSITION SPECIFYING UNIT
1004: OPERATION INFORMATION TRANSMISSION UNIT
101: MEMORY
102: WIDE AREA COMMUNICATION INTERFACE
103: CONNECTION INTERFACE
104: RECORDING MEDIUM
11: STEREO CAMERA
12: WORK MEDIUM
12a: HYDRAULIC EXCAVATOR
12b: WHEEL LOADER
12c: DUMP TRUCK
12d: WORKER
2: INFORMATION PROVIDING DEVICE
200: CPU
2001: OPERATION INFORMATION RECEPTION UNIT
2002: OPERATION INFORMATION TRANSMISSION UNIT
201: MEMORY
202: WIDE AREA COMMUNICATION INTERFACE

The invention claimed is:

1. An operation information transmission device transmitting a state of each work medium performing work in a construction site to a server device, the operation information transmission device comprising:
an image data acquisition unit that acquires image data including one or more images of the work medium;
a type/state specifying unit that specifies the type and a state of the work medium included in the image data on the basis of the one or more images of the work medium; and
an operation information transmission unit that transmits operation information indicating the specified type and state of the work medium to the server device.

2. The operation information transmission device according to claim 1, further comprising:
a position specifying unit that specifies a position of the work medium on the basis of the image data,
wherein the type/state specifying unit that specifies the state of the work medium on the basis of the specified position.

3. The operation information transmission device according to claim 1,
wherein the type/state specifying unit performs an image extraction process on the acquired image data.

4. The operation information transmission device according to claim 1,
wherein the image data acquisition unit acquires a plurality of pieces of image data generated through consecutive capturing images, and
wherein the type/state specifying unit specifies the state of the work medium on the basis of the plurality of pieces of image data.

5. A construction management system comprising:
the operation information transmission device according to claim 1; and
the server device,
wherein the server device includes
operation information reception unit that receives the operation information from the operation information transmission device via a wide area network, and
an operation information transmission unit that transmits the received operation information to an output device of a user via the wide area network.

6. An operation information transmission method of transmitting a state of each work medium performing work in a construction site to a server device by using an operation information transmission device, the operation information transmission method comprising:
acquiring image data including one or more images of the work medium;
specifying the type and a state of the work medium included in the image data on the basis of the one or more images of the work medium; and
transmitting operation information indicating the specified type and state of the work medium to the server device.

7. A computer storage device storing a computer program, which when executed by a computer of an operation information transmission device implements a method of transmitting a state of each work medium performing work in a construction site to a server device, the method comprising:
acquiring image data including one or more images of the work medium;
specifying the type and a state of the work medium included in the image data on the basis of the one or more images of the work medium; and
transmitting operation information indicating the specified type and state of the work medium to the server device.

8. The operation information transmission device according to claim 2,
wherein the type/state specifying unit performs an image extraction process on the acquired image data.

9. The operation information transmission device according to claim 2,
wherein the image data acquisition unit acquires a plurality of pieces of image data generated through consecutive capturing images, and
wherein the type/state specifying unit specifies the state of the work medium on the basis of the plurality of pieces of image data.

10. The operation information transmission device according to claim 3,
wherein the image data acquisition unit acquires a plurality of pieces of image data generated through consecutive capturing images, and
wherein the type/state specifying unit specifies the state of the work medium on the basis of the plurality of pieces of image data.

11. A construction management system comprising:
the operation information transmission device according to claim 2; and
the server device,
wherein the server device includes
operation information reception unit that receives the operation information from the operation information transmission device via a wide area network, and
an operation information transmission unit that transmits the received operation information to an output device of a user via the wide area network.

12. A construction management system comprising:
the operation information transmission device according to claim 3; and
the server device,
wherein the server device includes
operation information reception unit that receives the operation information from the operation information transmission device via a wide area network, and
an operation information transmission unit that transmits the received operation information to an output device of a user via the wide area network.

13. A construction management system comprising:
the operation information transmission device according to claim 4; and
the server device,
wherein the server device includes
operation information reception unit that receives the operation information from the operation information transmission device via a wide area network, and
an operation information transmission unit that transmits the received operation information to an output device of a user via the wide area network.

14. A construction management system comprising:
the operation information transmission device according to claim 8; and
the server device,
wherein the server device includes
operation information reception unit that receives the operation information from the operation information transmission device via a wide area network, and
an operation information transmission unit that transmits the received operation information to an output device of a user via the wide area network.

15. A construction management system comprising:
the operation information transmission device according to claim 9; and
the server device,
wherein the server device includes
operation information reception unit that receives the operation information from the operation information transmission device via a wide area network, and
an operation information transmission unit that transmits the received operation information to an output device of a user via the wide area network.

16. A construction management system comprising:
the operation information transmission device according to claim 10; and
the server device,
wherein the server device includes
operation information reception unit that receives the operation information from the operation information transmission device via a wide area network, and
an operation information transmission unit that transmits the received operation information to an output device of a user via the wide area network.

17. The operation information transmission device of claim 1, wherein the type/state specifying unit is configured to extract and analyze a region of the one or more images containing the work medium from the acquired image data to specify the type and state of the work medium included in the image data.

18. The operation information transmission device of claim 17, wherein the acquired image data comprises moving image data, which is a plurality of pieces of image data generated through consecutive image captures, each piece of image data comprising a single still image.

* * * * *